United States Patent [19]

Berecz

[11] Patent Number: 5,182,060

[45] Date of Patent: Jan. 26, 1993

[54] CONTINUOUS FORMING OF COMPOSITES

[75] Inventor: Imre Berecz, Santa Margarita, Calif.

[73] Assignee: E. I. Du Pont de Nemours and Company, Wilmington, Del.

[21] Appl. No.: 721,781

[22] Filed: Jan. 31, 1991

[51] Int. Cl.⁵ .................... B29C 47/18; B29C 43/30
[52] U.S. Cl. ..................... 264/70; 156/166; 156/180; 156/289; 264/25; 264/174; 264/258; 264/322; 264/325
[58] Field of Search ............ 264/174, 25, 257, 320, 264/325, 136, 324, 322, 70, 71, 258, 331.21; 156/166, 180, 289; 425/112, 114

[56] References Cited

U.S. PATENT DOCUMENTS

| | | | |
|---|---|---|---|
| 2,938,566 | 5/1960 | Toulmin, Jr. | 264/174 |
| 2,979,431 | 4/1961 | Perrault | 264/135 |
| 4,462,946 | 7/1984 | Goldsworthy | 425/112 |
| 4,622,192 | 11/1986 | Ma | 264/136 |
| 4,678,699 | 7/1987 | Kritchevsky et al. | 428/175 |
| 4,749,613 | 6/1988 | Yamada et al. | 428/286 |
| 4,818,460 | 4/1989 | Nied | 264/310 |
| 5,026,447 | 6/1991 | O'Connor | 156/166 |
| 5,026,514 | 6/1991 | Hauwiller et al. | 264/294 |
| 5,039,572 | 8/1991 | Bobsein et al. | 156/180 |
| 5,043,128 | 8/1991 | Umeda | 264/258 |
| 5,057,175 | 10/1991 | Ashton | 156/289 |

Primary Examiner—Jeffery Thurlow

[57] ABSTRACT

A continuous forming method is provided here whereby long composite structural shapes such as "Z", "HAT", "L", etc. can be formed economically with relatively small equipment. First, a lay-up is made from unidirectional tape or woven cloth, then the material is heated to accommodate softening of resin, then pulled through a set of rollers, then through a matched metal die and a rapidly reciprocating punch that facilitates to form the final shape. As the material is pulled through the area of match metal die and punch, it is cooled down by the heat sink of the die and punch, or any other means, so when the part exits the die and punch area, it is sufficiently cooled down to retain the desired shape. The rapidly reciprocating punch permits the part to be pulled continuously, thereby enabling it to produce a long part very economically.

6 Claims, 3 Drawing Sheets

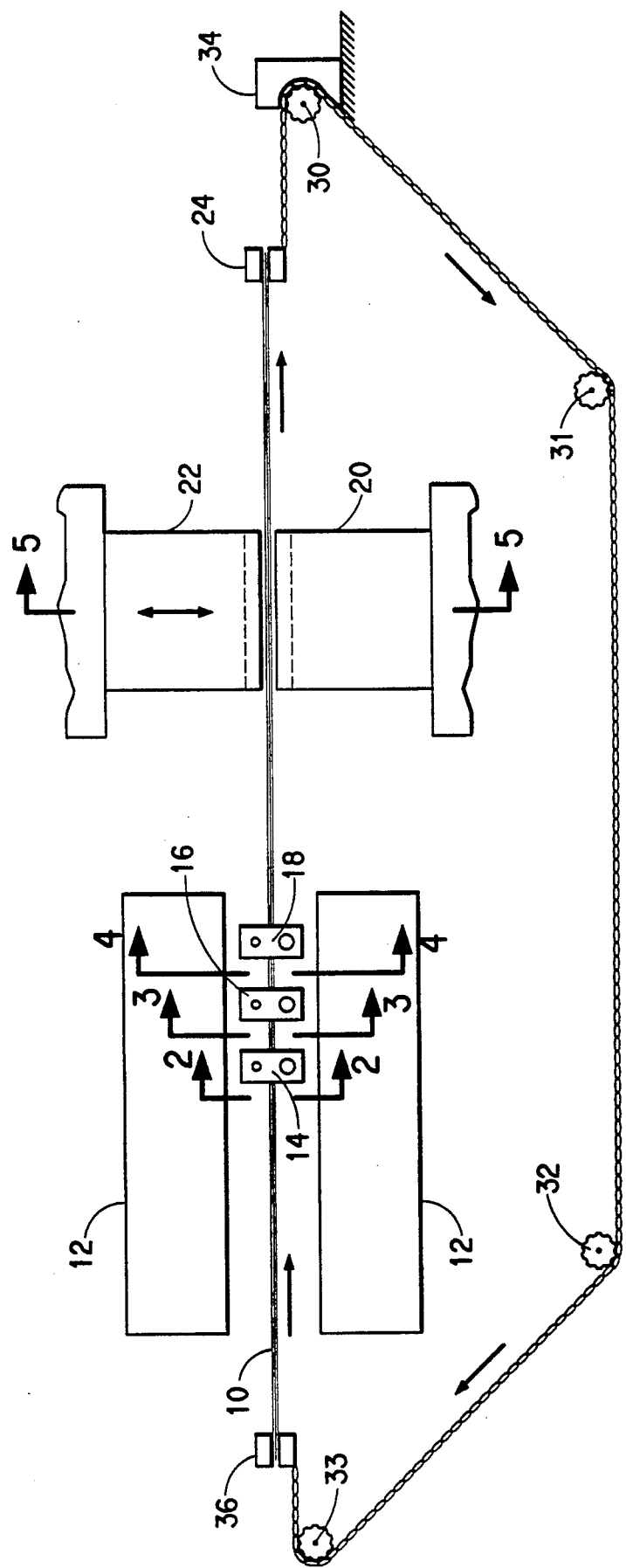

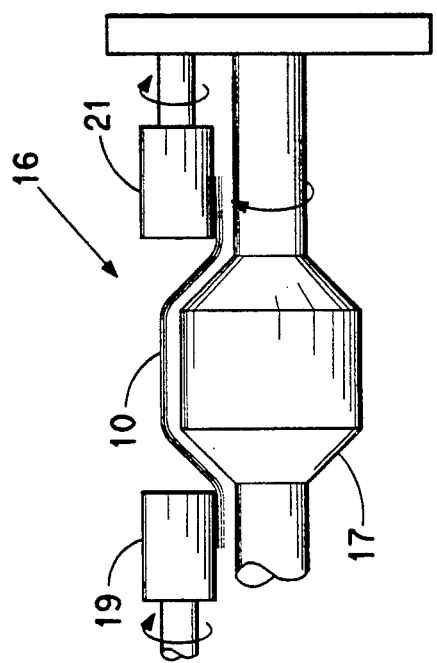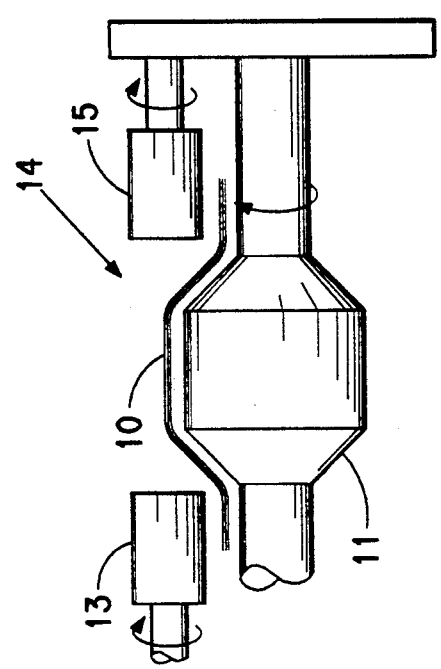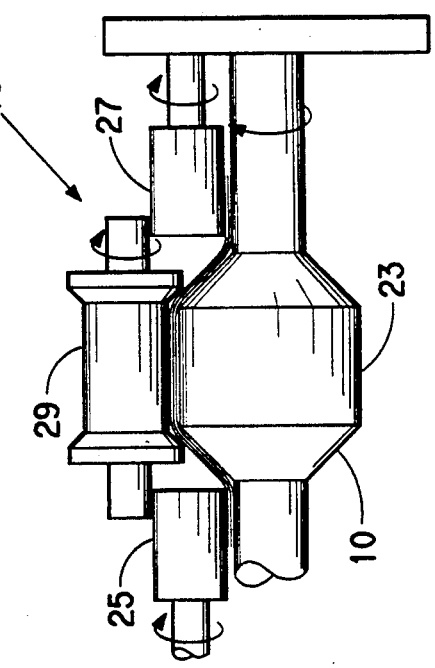

CONTINUOUS FORMING OF COMPOSITES

BACKGROUND OF THE INVENTION

This invention relates to a continuous forming method to produce various long stringers, stiffeners, panels and frames made from composite materials where the forming apparatus is considerably smaller than the length of the produced parts.

Current methods available to manufacture long composite structures such as stringer, stiffeners, panels and frames of various cross sections are autoclave or pultrusion processing. The autoclave process involves having a male or female tool of the desired shape and length. After the desired lay-up is completed in the tool using unidirectional tape, woven cloth or other material, it is vacuum bagged and put into an autoclave oven where it is heated to a melting temperature of the resin, then pressure is applied to the whole part within the autoclave and this pressure is maintained until the part cools off sufficiently to allow the part to maintain the shape of the tool without any pressure. When this stage is reached, the pressure is turned off and the part is removed from the autoclave. While this method can produce quite suitable parts, it has a number of disadvantages.

(a) The tool has to be as long as the part being produced so if a 50' long part is needed, the tool has to be at least 50' long. A tool of this size can be very expensive.

(b) Since the whole part is heated and under pressure in the autoclave, the equipment has to be large enough to accommodate the whole tool. Again, in the case of a large part, it can be very expensive to operate, heat and cool a large autoclave.

(c) Heating and cooling the large autoclave is time consuming so production rate is slow resulting in expensive fabricating costs.

Producing long parts by pultrusion has its problems and limitations. In this concept a metal pultrusion die is used having an opening of the same configuration as the desired cross section of the part to be produced. The material is in the form of resin impregnated fiber tows. This material is first heated to the resin's melting temperature, then it is pulled continuously through the opening of the pultrusion die. During this process the part is being cooled off and as it exits the pultrusion die it has solidified to the desired shape. While this process is very economical due to the pultrusion speed, it has very serious limitations.

(a) For maximum strength designers like to have a large percentage of fiber content (60–70%) since the fibers are the ones that carry most of the load. For this same reason they like to have the large percentage of fibers aligned to the direction of the main stress the part is subjected to during use. This, of course, means that most of the fibers are angular or perpendicular to the length of the part. This kind of fiber orientation is very difficult or impossible to obtain with pultrusion, therefore, pultruded parts have most of the fibers running longitudinally within the part which severely limits the part's strength in more than the one direction.

(b) To achieve maximum strength a composite part has to be well consolidated, that is, to have a minimum amount of voids and porosity. This can be achieved by applying a considerable amount of pressure during forming when the resin is still in the melted stage. This kind of pressure cannot be applied to the part during pultrusion. During the process the material is being pulled through the pultrusion die and the material is contacting and slipping by the inner wall of the die opening. This results in friction between the two surfaces. Large pressure on the material (that is needed for good consolidation) results in larger friction, making it harder to pull the composite material through the pultrusion die resulting in fiber breakage and stopping the pultrusion process. Pultruders try to overcome this problem by putting more fibers in the longitudinal direction and have a larger percentage of resin to accommodate slipping between die surface and the pultruding material. Also, this problem with friction limits the possibility of placing fibers in an angular or perpendicular direction of the part during pultrusion.

SUMMARY OF THE INVENTION

The present invention involves heating an elongated fiber reinforced thermoplastic resin composite to about the resin's melting point, then the composite is pulled through a set of free spinning rollers positioned in a manner to produce as near net shape as possible without a wrinkle or tears.

Since the composite material is being pulled through and not being squeezed and forwarded by the rolls, composite material can be formed to near net shape around its longitudinal axis without wrinkles and tearing. Then as the composite material exits the forming rollers, it immediately enters a matched metal die and a rapidly reciprocating punch having the desired shape and dimensional characteristic of the cross sectional configuration desired. As the material is pulled through this stage, the rapidly reciprocating punch applies pressure blows to the composite forming it into the final shape and dimension. During this process the part also is being cooled by the heat sink of the metal die and punch or additional cooling means (such as cool air or water flowing through the die) so, when the material exits the matched metal die and punch, it is cooled off sufficiently to retain the shape of the matched metal die and punch without any additional support.

Suitable thermoplastic resins include, for example, polyesters, polyamides, copolyamides polyolefins and polyetherketoneketone (PEKK), both amorphous and semicrystalline. The polyaryletherketone resin consists of repeating units (as disclosed in U.S. Pat. No. 4,937,135) of 1,4 phenylene groups (T, terephthalyl groups) and 1,3 phenylene groups (I, isophthalyl groups); the T:I ratio being 50:50 to 80:20, preferably 60:40 to 70:30. Polyetherether-ketone (PEEK) Stabar® from ICI, polyetherimide (PEI) Ultem® from GE, and polyethersulfone (PES) Radel® X from Amoco. Useful fibers for reinforcing the thermoplastic resin facings are carbon, aramid and glass fibers.

BRIEF DESCRIPTION OF THE DRAWINGS

FIG. 1 is a schematic illustration of apparatus useful in practicing the invention.

FIG. 2 is a view of FIG. 1 taken along line 2—2.

FIG. 3 is a view of FIG. 1 taken along line 3—3.

FIG. 4 is a view of FIG. 1 taken along line 4—4.

DETAILED DESCRIPTION OF THE ILLUSTRATED EMBODIMENT

Figure 5:
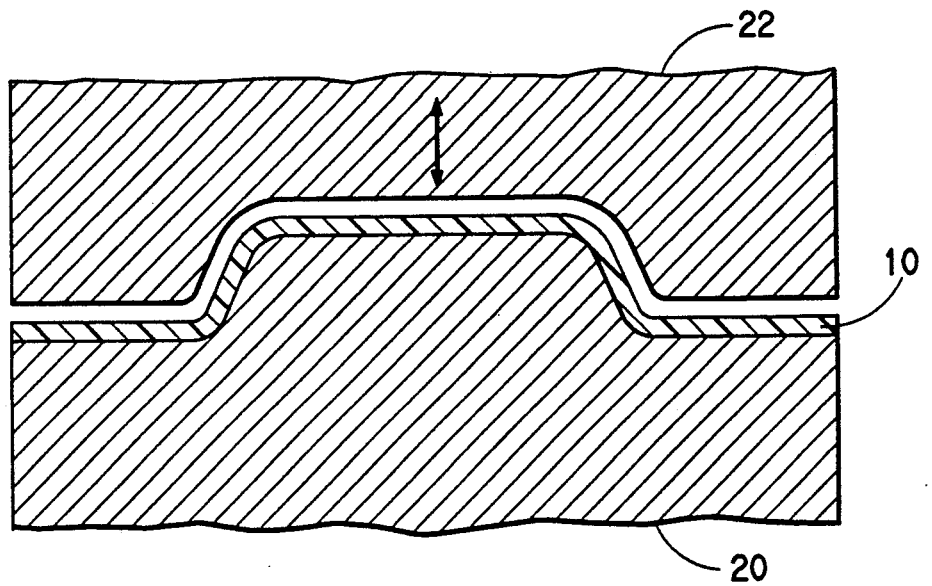
FIG. 5 is an enlarged schematic cross section of a hat-shaped composite as it passes through the punch and die taken along line 5—5 of FIG. 1.

In the embodiment chosen for purposes of illustration, an elongated fiber reinforced composite 10 is pulled at a specified speed through an oven 12 (such as Casso-Solar IR heating panels), then through three sets of rollers 14, 16 and 18 and a matched die 20 and reciprocating punch 22 by means of a clamp 24 attached to one end of composite 10. Clamp 24 is attached to chain 26 which is entrained around sprockets 30, 31, 32 and 33, and then connected to a clamp 36 attached to the opposite end of composite 10. The position of sprocket 33 can be adjusted to maintain proper tension in chain 26. Sprocket 30 is driven by a variable speed gear drive 34.

The three sets of rollers 14, 16, 18 are arranged to define the near net shape (cross sectional configuration around the longitudinal axis) of the elongated composite material 10. More particularly, referring to FIGS. 2-4, it can be seen that composite 10, after being heated in oven 12 to about the melting temperature of the resin matrix forming the composite, is formed by being pulled through rollers 11, 13, 15 (FIG. 2) into an approximate hat shape cross-section configuration. Then upon being pulled through the next set 16 of rollers 17, 19, 21 the composite still in the molten state is more closely configured to the desired cross section (FIG. 3). In FIG. 4 it is seen that the molten composite upon being pulled through the set of rollers 18 composed of rollers 23, 25, 27, 29 reaches the near-net hat shaped configuration. The purpose of the independently rotating rollers is to minimize the slippage between the composite 10 and the surface of the rollers as shown in FIG. 4. The rollers rotate at approximately the same surface speed to minimize slippage. Finally, the composite is pulled in direct contact with and through matching die 20 and rapidly reciprocating punch 22 which applies pressure blows directly to the composite, forming it into the final shape and dimension (FIG. 5). The punch and die serve as heat sinks, cooling the composite from its molten state to a solidified form wherein it retains its formed shape without any additional support. There are numerous reciprocating punch and die apparatus which will operate successfully in this operation. One such apparatus is a 45 ton punch press (0.75" stroke, 150-1000 strokes per minute) model No. B-45 by Minster.

During the repeated hammering operation by the punch 22, the composite is held momentarily from forward progress but there is sufficient slack in the chain and sprocket that carries clamp 24 to accommodate this momentary squeezing of the composite without damaging the composite.

EXAMPLE

In a series of runs using an apparatus arrangement similar to that shown in FIG. 1 forming hat shaped composite structures are formed using 22 plies of PEKK/carbon fiber (approximately 0.1 inch thick), satisfactorily formed sections (approximately 0.1 inch thick) were obtained at an oven temperature of 700°±25° F. and pulling speeds of 4 feet/minute while operating the punch in the range of from about 275 to 300 strokes per minute.

With regard to stroke rate of the punch, if the stroke rate is too low, the part becomes pinched and held for longer periods and then moves in a jerky fashion which may damage the puller system. As for the speed of the puller system, if it runs too slowly, the composite cools before it reaches the forming die and cracking of the composite could occur. If, on the other hand, the composite runs too fast, the composite leaves the forming die before it cools in the center of the ply layup and consequently could deconsolidate or the part will not retain its desired shape.

A ratio of stroke rate to puller speed which produces a length of travel of about 0.25 inches per stroke is preferable. However, this depends on composite thickness with thicker parts requiring less travel per stroke. Thus, pulling speed is proportional to die length and inversely proportional to composite thickness.

Figure 6:
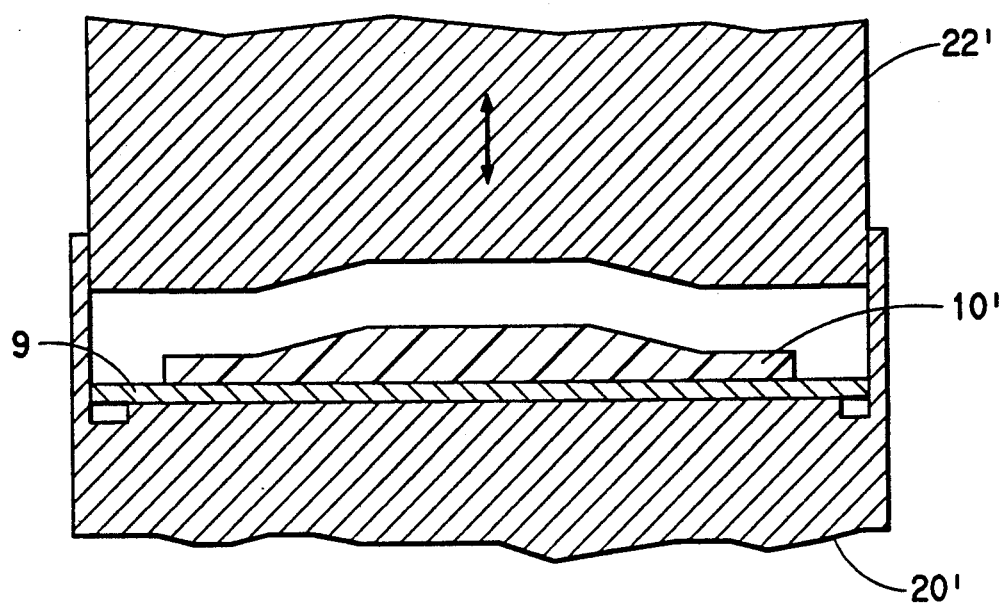
FIG. 6 is a schematic cross section of a composite being moved through the punch and die on a carrier.

In another embodiment of the invention, the composite is formed into a shape without the use of the three sets of rollers 14, 16 and 18. More particularly, as shown in FIG. 6, after being heated the composite 10", which may be a sheet of even or uneven cross-section, is carried on a carrying plate 9 through the die 20' and reciprocating punch 22'. In this instance the plate 9 is connected to clamps 24 and 36 (FIG. 1). The carrying plate 9 also serves as a means to locate the composite material in the transverse direction in the event that an uneven cross section thickness part is passing through the punch and die for consolidation. Since the composite material in its heated state is very soft and pliable as it enters the punch and die, the material has insufficient lateral rigidity to be used by itself to position itself under the punch. So the composite material 10' is clamped to the carrying plate 9 and the edges of the plate are used to exactly locate the composite material under the punch and die.

What is claimed is:

1. A method for shaping a fiber reinforced thermoplastic resin composite having a specified thickness into a specified cross section configuration by means of a matched die and punch defining said specified cross section configuration, said method comprising:
   (a) heating the composite to a temperature of about the melting temperature of the resin prior to said composite entering said matched die and punch;
   (b) pulling the heated composite through and in direct contact with said matched die and punch
   (c) moving said punch toward and away from said die at a rate to apply rapidly repeating blows to the heated composite to shape the composite into said cross sectional configuration as the heated composite is pulled through the matched die and punch; and
   (d) cooling said composite sufficiently to retain said cross sectional configuration.

2. A method for shaping an elongated fiber reinforced thermoplastic resin composite having a specified thickness into a specified cross sectional configuration around the longitudinal axis of the composite by means of a set of rotatable rollers and a matched die and punch defined by configuration, said method comprising:
   (a) heating the composite to a temperature about the melting temperature of the resin prior to said composite entering said rollers and said matched die and punch;
   (b) pulling the heated composite through and in direct contact with said set of rotatable rollers arranged to define the near net shape of said cross sectional configuration;
   (c) passing composite from said set of rotatable rollers through and in direct contact with said matched die and punch defining said cross sectional configuration;

(d) moving said punch toward and away from said die at a rate to apply rapidly repeating blows to the heated composite to shape the composite into said cross sectional configuration as the heated composite is pulled through the matched die and punch; and (e) cooling and composite sufficiently to retain said cross sectional configuration.

3. The method of claim 1 or 2 wherein the speed the composite is pulled is proportional to the defined length of the die and inversely proportional to the composite thickness.

4. The method of claim 1 or claim 2 wherein the rate of reciprocation of said punch is in the range of from about 275 to about 300 strokes per minute and said composite is pulled at the speed of from about 4 to about 7 feet per minute.

5. The method of claim 1 or claim 2 wherein said thermoplastic resin is polyetherketoneketone and said fiber is carbon.

6. The method of claim 1 or claim 2 wherein said fibers are selected from the group consisting of carbon, aramid and glass.

* * * * *